United States Patent Office 3,804,800
Patented Apr. 16, 1974

3,804,800
FLAME RESISTANT POLYMERS CONTAINING AMIDE COMPLEXES OF METAL SALTS
Richard N. Knowles, Hockessin, Del., assignor to E. I. du Pont de Nemours and Company, Wilmington, Del.
No Drawing. Original application July 23, 1971, Ser. No. 165,717, now Patent No. 3,705,128, dated Dec. 5, 1973. Divided and this application Oct. 13, 1972, Ser. No. 297,039
Int. Cl. C08f 45/62; C08g 51/62
U.S. Cl. 260—45.75 R           4 Claims

ABSTRACT OF THE DISCLOSURE

Flame resistant polymers, such as halogenated polyesters and polyvinyl chloride containing amide complexes of certain metal salts such as zinc chloride-N-methylpyrrolidone, and articles such as molded bodies, films, etc., of such flame-resistant polymers.

CROSS REFERENCE TO RELATED APPLICATIONS

This application is a divisional of my copending application Ser. No. 165,717, filed July 23, 1971, now U.S. Pat. 3,705,128, issued Dec. 5, 1973.

BACKGROUND OF INVENTION

Complexes of various metal salts with amides are reported by S. J. Kuhn et al., Canadian J. Chemistry, 43, 375 (1965), by M. A. J. Jungbauer et al., Nature, 202, 290 (1964), by M. Glavas et al., J. Inorganic and Nuclear Chemistry, 31, 291 (1969), and by W. E. Bull et al., Inorganic Chemistry, 2, 303 (1963). Spectroscopic, thermal, and electrochemical data were developed to help elucidate the structure of these complexes. British Pat. 774,956 discloses iron salt complexes with a variety of amides for use as organic soluble carbonylation catalysts.

Antimony, tin and zinc oxides have been used as flame retardants in the presence of halogenated compounds. A number of borates, such as zinc borate, also are known flame retardants. These metal oxides and borates, however, are quite insoluble in most organic systems, producing pigmentation and opacity in articles containing them. Therefore, they are unsuitable for use where high levels of light transmission are required.

The halides of metals such as antimony, tin and zinc are also known to flame retardants ("Modern Plastics," p. 102, September 1966). These salts, however, have a tendency to degrade many polymeric systems and thus their use as flame retardants is quite limited. For example, zinc chloride causes severe discoloration and loss of strength in halogenated polyesters.

SUMMARY OF INVENTION

This invention relates to flame resistant polymers containing amide complexes of certain metal salts in an amount to impart flame retardancy to the polymer. Preferred polymers are halogenated polyesters and polyvinyl chlorides. Articles formed from such flame resistant polymers have greater clarity and strength than can be obtained when metal salts are used alone to impart flame retardancy.

As a means of incorporating the amide complexes into the polymer, the complexes can be dispersed as a solid in the molten polymer or prepolymer or they can be dissolved with the polymer or prepolymer in a mutual solvent. In general, the level of amide complex in the polymer will range from 0.5 to 30% by weight. The amide complexes can be used with other flame retardants such as phosphorous and antimony compounds.

DETAILED DESCRIPTION OF INVENTION

The complexes useful for purposes of the invention can be illustrated by the following formula:

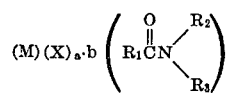

where
M is boron, aluminum, iron, zinc, lead, tin or antimony;
X is chlorine, bromine, or iodine;
$a$ is an integer in the range of from 2–5 such that the salt MX is neutral;
$R_2$ is hydrogen or alkyl or 1–3 carbon atoms;
$b$ is 1 or 2; and
$R_1$ and $R_3$ are joined together to form the group —$(CH_2)_n$— wherein $n=3$ or 4.

Exemplary of the complexes useful for the invention is:

The amide complexes of the invention can be prepared according to the methods of S. J. Kuhn et al., Canadian J. Chemistry, 43, 375 (1965), W. E. Bull et al., Inorganic Chemistry, 2, 303 (1963), and U.S. Pat. 3,297,425.

The preferred polymeric materials are halogenated polyesters and polyvinyl chloride. Examples of suitable halogenated polyesters are given in R. C. Nametz, Industrial and Engineering Chemistry, vol. 59 (1967), pp. 99–116. Further examples of suitable halogenated polyesters are described in U.S. Pats. 2,810,712 and 3,536,782; these materials may be characterized as halogenated unsaturated polyesters derived from a halogenated unsaturated polycarboxylic acid and a polyol.

The term "polyvinyl chloride" as used herein is intended to include polymers and copolymers of vinyl chloride and compositions containing such a polymer or copolymers in combination with a plasticizing agent to increase the polymer or copolymer's workability or flexibility. Examples of plasticizing agents can be found in Modern Plastics Encyclopedia, 1970–71, pp. 856–867. The manner of using such plasticizers, the properties imparted by their use and the mechanism involved are reviewed in Encyclopedia of Polymer Science, 2nd ed., vol. 10, pp. 228–306.

Other polymeric materials which can be made flame resistant with the amide complexes include polypropylene, polyvinylidene chloride, polymethylmethacrylate, polyesters, polyurethanes, polystyrene, styrene-acrylonitrile copolymers, epoxy resins, acrylonitrilebutadienestyrene terpolymers, formaldehye polymers, polycarbonates, polyvinyl alcohol, polyvinyl acetate, ureaformaldehyde polymers and phenolformaldehyde polymers.

If the polymeric material does not inherently contain halogen, the amide complex should be added with a material which provides a source of halogen in order to give effective flame retardancy. The halogen source preferably is a highly chlorinated or brominated material, such as Chlorowax® 70 (a chlorinated hydrocarbon wax supplied by Diamond Shamrock Company) provided it is compatible with the particular polymer system in the proportions it is used.

In general, the amount of amide complex which is added to the polymeric material to impart flame retardancy will be in a range of from 0.5 to 30% by weight. Below 0.5% little improvement in flame retardancy is obtained. Above 30% added improvements in flame retardancy are small and the deterioration of other properties of the polymeric material is apt to occur. The preferred level of amide complex in the polymer is in the range of from 1 to 10% by weight.

The amide complexes can be incorporated into the polymer by mixing the dry powders with the powdered or melted polymer using any of the techniques currently used in the art for mixing antimony oxide or other solid pigment or filler with polymeric materials for extrusion or blow molding. Alternatively, the complexes can be dissolved with the polymeric material in a mutual solvent such as N,N-dimethylformamide.

If desired, the amide complexes can also be mixed wtih prepolymers prior to hot pressing and casting operations. Flame retarded, reinforced polyester panels having high light transmission can be produced this way.

As the molecular weight of the amide portion of the complex increases, the organic solubility of the complex increases. As the solubility increases, the light transmission of polymeric materials containing the amide complex increases. The solubility of the complexes is sufficiently high in halogenated polyesters and polyvinyl chloride so that flame retardant articles can be made having a high degree of clarity.

The flame resistant polymers of the invention can contain, in addition to the amide complexes, other flame retardant compounds such as antimony oxide, zinc borate, tricresylphosphate, or alumina hydrate.

Both the metallic and amide portions of the complex present in the flame resistant polymers of the invention can be identified by relatively simple analytical methods. The method used for the metallic species is X-ray fluorescence spectroscopy. This method is discussed by I. M. Kolthoff, P. J. Elving, and E. B. Sandell in Treatise on Analytical Chemistry, vol. 5, John Wiley & Sons, N.Y. (1964); particularly in part 1, section D-3, chapter 60. It is also discussed by H. A. Liebhassky, X-ray Absorption and Emission in Analytical Chemistry, John Wiley & Sons, N.Y. (1960).

The method used for the amide portion is mass spectroscopy. The flame retarded polymer is ground into a fine powder. A sample of the powder is placed in a sample tube in the mass spectrometer. The temperature of the sample probe is gradually raised until mass peaks are observed. The sample can be irradiated with from 15 to 80 e.v. and the amide identified by its fragmentation pattern and molecular ion. The American Petroleum Institute (API) reference spectra can be used to help in the analysis of the spectrum. API Reference Spectrum No. 1133 is for DMF.

The following examples will serve to further illustrate the invention. In these examples all percentages are weight percent. The HLT-15 flammability test method referred to is described by R. E. McMahon et al., 25th Annual Technical Conference (1970). Reinforced Plastics/Composites Division of the Society of the Plastic Industry, Inc., in section 9-C, pp. 1-12.

EXAMPLE 1

The complexes useful in the invention are synthesized by dissolving the metal halide in excess amide solvent. The excess solvent is then stripped at 80-100° C. and 1-10 mm. of mercury, leaving the crude residual complex. The complexes can be recrystallized or used in the crude form. An exemplary complex, melting point, recrystallization solvent and infrared and nuclear magnetic resonance spectroscopic data is show in Table I. Data on N-methylpyrrolidone is given for comparison.

EXAMPLE 2

A 8" x 7" x ⅛" polyester panel is made by mixing the following ingredients and hot pressing them.

|  | Percent |
|---|---|
| Hetron® 23925 (a polyethylenechlorendate/styrene polyester supplied by Hooker Chemical Co.) | 94.4 |
| $ZnCl_2 \cdot 2DMF$ | 4.7 |
| Benzoyl peroxide | 1.0 |

The Hetron® 23925 resin and the $ZnCl_2 \cdot 2DMF$ are mixed for 30 minutes at 35-42° C., and then the benzoyl peroxide is added. The mixture is stirred for an additional 20 minutes before pouring it into a 8" x 7" x ⅛" mold at 45-50° C. The mold is placed in a hot press with 29,000 p.s.i. on the 2.56 in. diameter (6.50 cm.) piston, and heated according to the following schedule.

| Time, minutes: | Temperature |
|---|---|
| 15 | 79° C. (175° F.) |
| 20 | 107° C. (255° F.) |
| 20 | 135° C. (275° F.) |

The press is then cooled to 121° C. (250° F.) with air, and to 65° C. (149° F.) with water before removing the mold from the press.

The panel, which has fine $ZnCl_2 \cdot 2DMF$ crystals in it, is highly translucent, and has an HLT-15 flammability rating of 92.

The use of $ZnCl_2 \cdot DMF$ (zinc chloride dimethylformamide) is not within the scope of the present invention but is offered to indicate the curing and heat pressing entailed.

EXAMPLE 3

A 8" x 7" x ⅛" polyester panel is made by mixing the following ingredients and hot pressing them.

|  | Percent |
|---|---|
| Hetron® 23925 | 91.7 |
| $ZnCl_2 \cdot 2NMP$ | 7.4 |
| Benzoyl peroxide | 0.9 |

The ingredients are mixed and hot pressed according to the conditions described in Example 2. The resulting panel is crystal clear and has an HLT-15 flammability rating of 92.

EXAMPLE 4

A 8" x 7" x ⅛" polyester panel is made by mixing the following ingredients and hot pressing them.

|  | Percent |
|---|---|
| Dion® FR6399 | 96.2 |
| $ZnCl_2 \cdot 2NMP$ | 2.9 |
| Benzoyl peroxide | 1.0 |

The ingredients are mixed and hot pressed according to the conditions described in Example 2. The resulting panel is crystal clear and has an HLT-15 flammability rating of 100.

What is claimed is:

1. A flame resistant composition of matter consisting essentially of a polymeric material selected from the group consisting of halogenated unsaturated polyesters derived from a halogenated unsaturated polycarboxylic acid and a polyol, and polyvinyl chloride and from 0.5

TABLE I

| Ex. | Complex | M.P. | Recrystallization solvent | I.R. (γ) | | N.M.R. (p.p.m.) | |
|---|---|---|---|---|---|---|---|
| | | | | C=O | N—C=O | N—CH₃ | |
| 1 | $ZnCl_2 \cdot 2NMP$ | 64-66 | Cyclohexanone. | 1,630 | | 2.99 | 3.58 ($C_5\underline{H}_2$),* 2.82 and 185-245 ($C_3\underline{H}_2$ and $C_4\underline{H}_2$). |
| | N-methylpyrrolidone | | | 1,670 | | 2.85 | 3.42 ($C_5\underline{H}_2$), 2.55-1.62 ($C_3\underline{H}_2$—$C_4\underline{H}_2$). |

*Subscript on carbon indicates the ring position and not the number of carbons.

to 30% by weight, based on said polymeric material, of an amide complex of the formula:

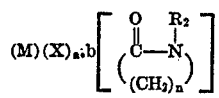

where
M is boron, aluminum, iron, zinc, lead, tin or antimony;
X is chlorine, bromine, or iodine;
$a$ is an integer in the range of from 2–5 such that the salt MX is neutral;
$R_2$ is hydrogen or alkyl of 1–3 carbon atoms;
$b$ is 1 or 2; and
$n$ is 3 or 4.

2. A composition of claim 1 wherein the polymeric material is a halogenated polyester.

3. A composition of claim 1 wherein the polymeric material is polyvinyl chloride.

4. A composition of claim 1 wherein the amide complex is $ZnCl_2 \cdot 2$N-methylpyrrolidone.

References Cited
UNITED STATES PATENTS

| | | | |
|---|---|---|---|
| 1,867,658 | 7/1932 | Dreyfus | 117—136 |
| 2,838,424 | 6/1958 | Depew | 117—137 |
| 3,239,482 | 3/1966 | Rapp | 260—45.75 |

DONALD E. CZAJA, Primary Examiner

V. P. HOKE, Assistant Examiner

U.S. Cl. X.R.

260—45.8 N, 45.75 B, 45.75 K, 860